United States Patent
Biere et al.

(10) Patent No.: US 7,822,846 B1
(45) Date of Patent: Oct. 26, 2010

(54) METHOD AND SYSTEM FOR BROKERING MEDIA FILES

(75) Inventors: Devon L. Biere, Olathe, KS (US); Michael A. Gailloux, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1310 days.

(21) Appl. No.: 11/340,113

(22) Filed: Jan. 26, 2006

(51) Int. Cl.
*G06F 15/173* (2006.01)

(52) U.S. Cl. .................. 709/224; 709/202; 709/203; 340/825; 382/113

(58) Field of Classification Search .......... 709/217, 709/218, 206, 224; 707/3, 104, 111, 6; 725/1, 725/101, 104; 382/254, 164; 701/207; 715/774; 705/8; 340/539.13
See application file for complete search history.

(56) References Cited

U.S. PATENT DOCUMENTS

| | | | | |
|---|---|---|---|---|
| 6,914,626 | B2 | 7/2005 | Squibbs | 348/231.3 |
| 7,028,253 | B1* | 4/2006 | Lieberman et al. | 715/232 |
| 2002/0035609 | A1* | 3/2002 | Lessard et al. | 709/217 |
| 2002/0059226 | A1* | 5/2002 | Cooper | 707/6 |
| 2002/0077876 | A1* | 6/2002 | O'Meara et al. | 705/8 |
| 2002/0099694 | A1* | 7/2002 | Diamond et al. | 707/3 |
| 2003/0005428 | A1* | 1/2003 | Roman | 725/1 |
| 2003/0025599 | A1* | 2/2003 | Monroe | 340/531 |
| 2003/0030733 | A1* | 2/2003 | Seaman et al. | 348/239 |
| 2003/0105827 | A1* | 6/2003 | Tan et al. | 709/206 |
| 2004/0004663 | A1* | 1/2004 | Kahn et al. | 348/207.1 |
| 2004/0071342 | A1* | 4/2004 | Locht et al. | 382/164 |
| 2004/0220965 | A1* | 11/2004 | Harville et al. | 707/104.1 |
| 2005/0039136 | A1* | 2/2005 | Othmer | 715/774 |
| 2005/0090294 | A1* | 4/2005 | Narasimhan | 455/575.1 |
| 2005/0193421 | A1* | 9/2005 | Cragun | 725/80 |
| 2005/0245241 | A1* | 11/2005 | Durand et al. | 455/414.1 |
| 2006/0020960 | A1* | 1/2006 | Relan et al. | 725/30 |
| 2006/0089160 | A1* | 4/2006 | Othmer | 455/457 |
| 2006/0095540 | A1* | 5/2006 | Anderson et al. | 709/217 |
| 2006/0112143 | A1* | 5/2006 | Subramanian | 707/104.1 |
| 2006/0170958 | A1* | 8/2006 | Jung et al. | 358/1.15 |
| 2006/0171603 | A1* | 8/2006 | Jung et al. | 382/254 |

(Continued)

OTHER PUBLICATIONS

Boll et. al. "MediÆther: an event space for context-aware multimedia experiences." The ACM Portal. Nov. 2003.*

(Continued)

*Primary Examiner*—Wing F Chan
*Assistant Examiner*—Michael Martinez

(57) ABSTRACT

A method and system for brokering a media file from a media provider to a media requester. A media provider, such as a camera phone, captures a media file. A media requester provides an event-definition record to a network entity so as to request a media file. The network entity requests that the media provider provide media files that meet criteria defined by the event-definition record. The media provider provides a media file and media file data associated with the media file to the network entity. The network entity compares the media file data to the event-definition record, and provides the media file to the media requester if the media file data matches the event-definition record. An enterprise operating the network entity brokers the sale of the media file, in part, by collecting a payment from a media requester user and making a payment to a media provider user.

21 Claims, 5 Drawing Sheets

U.S. PATENT DOCUMENTS

| | | | | |
|---|---|---|---|---|
| 2006/0238380 | A1* | 10/2006 | Kimchi et al. | 340/995.1 |
| 2006/0242178 | A1* | 10/2006 | Butterfield et al. | 707/100 |
| 2007/0127833 | A1* | 6/2007 | Singh | 382/254 |
| 2007/0135991 | A1* | 6/2007 | Riise et al. | 701/207 |
| 2007/0135993 | A1* | 6/2007 | Riise et al. | 701/207 |
| 2007/0198182 | A1* | 8/2007 | Singh | 701/211 |
| 2008/0186165 | A1* | 8/2008 | Bertagna et al. | 340/539.13 |
| 2008/0306921 | A1* | 12/2008 | Rothmuller et al. | 707/3 |
| 2009/0080800 | A1* | 3/2009 | Moraleda et al. | 382/276 |
| 2009/0106393 | A1* | 4/2009 | Parr et al. | 709/218 |

OTHER PUBLICATIONS

Adams et. al. "Extraction of social context and application to personal multimedia exploration." The ACM Portal. Oct. 2006.*

U.S. Appl. No. 10/151,499, filed on May 20, 2002, entitled Method and System for Marking Digital Photos with Characterizing Information from a Cellular Communication System.

U.S. Appl. No. 10/215,282, filed on Aug. 8, 2002, entitled Method and System for Managing Storage of Digital Images.

Danit Lidor, Point, Shoot, Sell, http://www.forbes.com/infoimaging/2005/08/19/cameras-cellphones-journalism-ex_dl_0819cameraphones, html, Aug. 19, 2005.

Yuki Noguchi, Camera Phones Lend Immediacy to Images of Disaster, http://www.washingtonpost.com/wp-dyn.content/article/2005/07/07/AR2005070701522_pf,html, Jul. 8, 2005.

Anita Wilhelm et al., Photo Annotation on a Camera Phone, CHI 2004, Apr. 24-29, 2004, Vienna, Austria, ACM 1-58113-703-Jun. 4, 2004.

Aleks Aris et al., Exploiting Location and Time for Photo Search and Storytellijng in MyLifeBits, Microsoft Research, Microsoft Corporation, Technical Report MSR-TR-2004-102, Sep. 2004.

Kodak Picture Center Online Service and Mobile Imaging Will Convert Cell Phones into Mobile Picture Albums, downloaded from World Wide Web at http://wwwuk.kodak.com/UK/en/corp/press/archive/2002/20020910.shtml, Sep. 2002.

MetaData in Image Files and GDI+, downloaded from World Wide Web at http://www.microsoft.com/whdc/archive/GDIplus_Metadata,mspx, Dec. 4, 2001.

* cited by examiner

METHOD AND SYSTEM FOR BROKERING MEDIA FILES

FIELD OF INVENTION

The present invention relates to media files, and more particularly to a media provider, a media requester, and transferring media files from the media provider to the media requester.

DESCRIPTION OF RELATED ART

Various devices are capable of capturing an input, storing a representation of the input as a media file, and providing the media file to another entity. Hereinafter, these various devices will be referred to as media providers. A media provider that includes a digital camera may capture an input comprising light waves and responsively store a representation of the light waves as a media file. A media provider that includes a digital voice recorder may capture an input comprising sound waves and responsively store a representation of the sound waves as a media file. A media provider that includes a digital video camera may capture an input comprising light waves and sound waves and responsively store a representation of the light waves and sound waves as a media file.

As the number of media providers increases, the use of media providers continues to increase and, as a result, the number of media files captured by media providers continues to increase as well. In some cases, a media file captured by a media provider may be of no interest to any person other than to a person whose media provider captured the media file.

However, in other cases, a media file captured by a media provider may be of interest to a person other than or in addition to the person whose media provider captured the media file. For example, a media file that includes a representation of an image associated with a news story may be of interest to a news reporter working at a media organization such as the British Broadcasting Corporation (BBC) or Time Warner Inc.'s Cable News Network (CNN). The news reporter may request that a person whose media provider captured media files associated with the news story provide those media files to the reporter.

In response to the reporter's request, the reporter may receive media files that are of interest to the reporter (e.g., media files associated with the news story) and media files that are of little or no interest to the reporter (e.g., media files not associated with the news story). It is desirable to reduce the number of media files sent to a person that requests media files, by sending only the files that are of interest to the person and by not sending the media files that are of little or no interest to the person.

SUMMARY

The present invention is directed to methods and systems for one or more media requesters to obtain one or more media files from one or more media providers. A media requester is a device and/or system that directly or indirectly requests a media provider to provide one or more media files to the media requester. A media provider then directly or indirectly provides one or more media files to the media requester.

In one respect, an exemplary embodiment of the present invention may take the form of a first method that includes a network entity receiving an event-definition record from at least one media requester. According to this first method, the event-definition record defines a geographic area and a time period. This first method also includes: (i) the network entity receiving, from a media provider, a media file and media file data associated with the media file, and (ii) the network entity comparing the media file data to the event-definition record to determine whether the media file was captured within the geographic area during the time period. If the network entity determines the media file was captured within the geographic area during the time period, the network entity responsively provides the media file to the at least one media requester.

In another respect, an exemplary embodiment of the present invention may take the form of a second method that includes a network entity receiving multiple event-definition records from one or more media requesters. According to the second method, each event-definition record defines a geographic area, a time period, and a priority value. This second method also includes: (i) the network entity receiving, from one or more media providers, multiple media files and for each file, associated file data indicating a location and a time each file was captured, (ii) the network entity comparing the file data associated with each media file to the multiple event-definition records so as to identify a set of media files captured (a) in a geographic area defined by a given event-definition record of the multiple event-definition records, and (b) during a time period defined by the given event-definition record. The priority value of the given event-definition record may be a highest priority value of priority values defined by the multiple event-definition records. This second method further includes providing one or more media files of the set of media files to at least one of the one or more media requesters.

In yet another respect, an exemplary embodiment of the present invention may take the form of a system that includes a processor, a communication interface, and data storage. The communication interface (i) receives an event-definition record defining a geographic area and a time period, and (ii) receives a media file and media file data associated with the media file. The communication interface receives the event-definition record from a media requester and the media file and media file data from a media provider. The data storage stores (i) the event-definition record, (ii) the media file and the media file data, and (iii) program instructions executable by the processor. The program instructions include instructions to (i) compare the media file data to the event-definition record so as to determine whether the media file was captured within the geographic area during the time period, and (ii) use the communication interface to send the media file to the media requester if the media file was captured within the geographic area during the time period.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which.

DETAILED DESCRIPTION

1. Overview

A media requester is a device and/or system that directly or indirectly requests a media provider to provide one or more media files to the media requester. The media requester can request to obtain media files associated with a particular event by sending an event-definition record (hereinafter "EDR") directly or indirectly to a media provider. The media provider may include a device and/or system that sends one or more media files directly or indirectly to the media requester in response to a received EDR.

The indirect sending of an EDR to the media provider may involve the media requester sending the EDR to a network entity and the network entity thereafter sending the EDR to the media provider. The indirect sending of one or more media files to the media requester may involve the media provider sending the one or more media files to a network entity and the network entity thereafter sending the one or more media files to the media requester.

The network entity, as described below, may include a device and/or system that interfaces with a network. The media provider and the media requester may also interface with a network or respective networks. Moreover, the network entity may include the media provider, or the media provider may include the network entity.

In response to receiving an EDR, a network entity and/or a media provider can provide media files captured by the media provider to the media requester. The media files provided to the media requester may comprise media files that a media provider captures (i) before the network entity and/or the media provider receives the EDR, (ii) while the network entity and/or the media provider receives the EDR, and/or (iii) after the network entity and/or the media provider receives the EDR.

Figure 1:
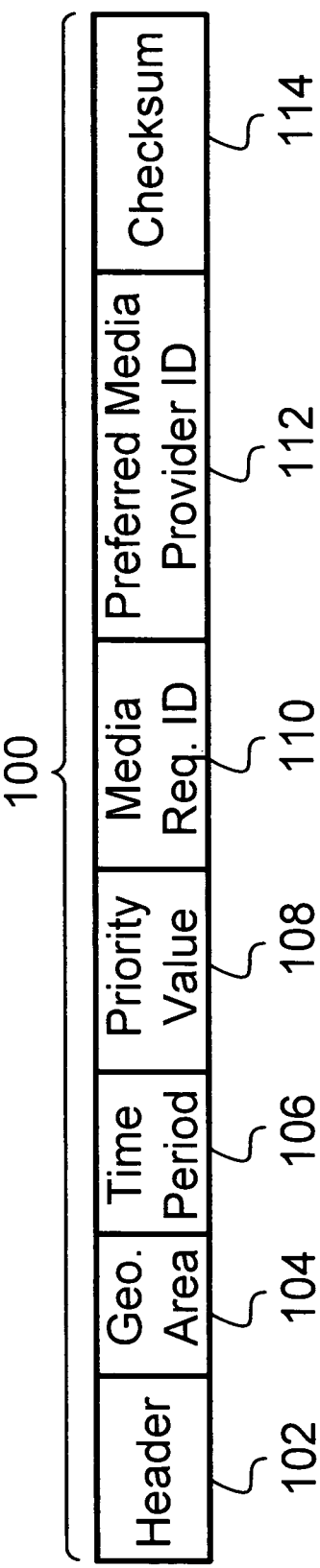
FIG. 1 illustrates an exemplary event-definition record.

An EDR may define an event by a particular geographic area and a particular time period. An EDR may also define a variety of information associated with an event and/or a variety of information associated with the EDR. FIG. 1 depicts an exemplary EDR 100 that includes (i) a header segment 102, (ii) a geographic area segment 104, (iii) a time period segment 106, (iv) a priority value segment 108, (v) a media requester identification (ID) segment 110, (vi) a preferred media provider identification segment 112, and (vii) a checksum segment 114.

Header segment 102 may be located at the beginning of EDR 100 and may comprise data that identifies information about EDR 100. For example, header segment 102 may comprise data that identifies (i) the number of data bytes within EDR 100, and (ii) multiple segment size values. Each segment size value may identify the number of data bytes within a particular segment of EDR 100 (e.g., the number of data bytes within geographic area segment 104). Other examples of information identified by header segment 102 are also possible.

Geographic area segment 104 may define one or more geographic areas. Each defined geographic area may identify an area on Earth that includes a landmass and/or a body of water. Each defined geographic area is associated with a time period defined by time period segment 106. The time period segment 106, and the association between the geographic area and time period, are discussed in more detail below.

Figure 2:
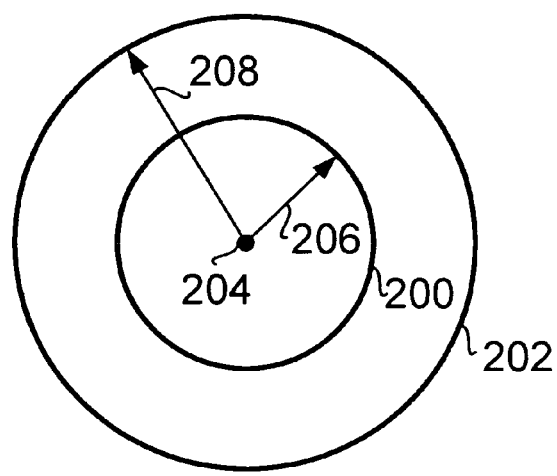
FIGS. 2 and 3 illustrate exemplary geographic areas that may be defined by an event-definition record (EDR)

Geographic area segment 104 may define each geographic area in any of a variety of ways. For example, geographic area segment 104 may define each geographic area as a circle having a location and a radius that extends from the location. FIG. 2 depicts two circular-shaped geographic areas identified as a first geographic area 200 and a second geographic area 202. First geographic area 200 may be defined by a location 204 and a first radius 206. Second geographic area 202 may be defined by the location 204 and a second radius 208. Alternatively, second geographic area 202 could be defined by the second radius 208 and another location that is remote from location 204.

Location 204 may be defined as the intersection of a line of latitude and a line of longitude. As an example, location 204 may be defined as the intersection of a line of longitude 73.986171 west and a line of latitude 40.756847 north. In this way, location 204 is a location at Times Square, New York, N.Y., United States.

First radius 206 and second radius 208 may be defined in various ways. For instance, the first radius 206 may be defined as 500 meters and the second radius 208 may be defined as 1,500 meters. Alternatively the first radius 206 may be a number of meters greater than or less than 500 and the second radius 208 may be a number of meters greater than or less than 1,500. Further, and alternatively, the first radius 206 and the second radius 208 may be an identical number of meters, and/or defined in some other units, such as yards, kilometers, or miles. Other exemplary ways to define the first radius 206 and the second radius 208 are also possible.

Figure 3:
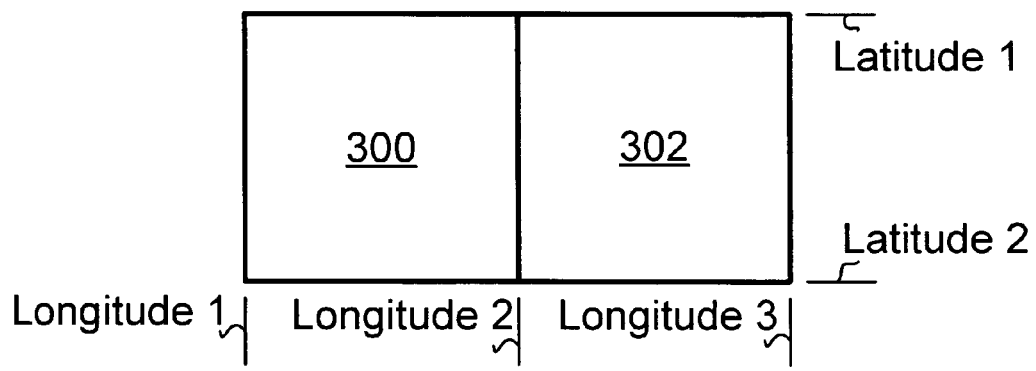

As another example, geographic area segment 104 may define each geographic area as a polygon. FIG. 3 depicts two polygon-shaped geographic areas identified as a third geographic area 300 and a fourth geographic area 302. Geographic area segment 104 may define the third geographic area 300 as an area between two lines of latitude (e.g., Latitude 1 and Latitude 2) and two lines of longitude (e.g., Longitude 1 and Longitude 2). Geographic area segment 104 may define the fourth geographic area 302 as an area between two lines of latitude (e.g., Latitude 1 and Latitude 2) and two lines of longitude (e.g., Longitude 2 and Longitude 3).

As shown in FIG. 3, the third geographic area 300 and the fourth geographic area 302 are contiguous in that each area shares a common boundary (i.e., the line of longitude "Longitude 2"). Alternatively, the third geographic area 300 could be remote from the fourth geographic area 302 such that the third geographic area 300 and the fourth geographic area 302 are not contiguous.

As yet another example, geographic area segment 104 may include data defining one or more elevations associated with a defined geographic area such as an area on which a given building sits. In accordance with this example, geographic area segment 104 may define (i) the address of the given building, (ii) a first elevation of 3.05 meters (10 feet), and (iii) a second elevation of 6.10 meters (20 feet). In this way, geographic area segment 104 may define a geographic area that includes the second story of the given building. Other examples of geographic area segment 104 defining one or more elevations, or one or more other geographic shapes are also possible.

Time period segment 106 may define one or more time periods. Each time period may be defined as (i) a time period that includes a time prior to when the media provider or the network entity receives the EDR, (ii) a time period that includes a time when the media provider or the network entity receives the EDR, and/or (iii) a time period that includes a time after the media provider or the network entity receives the EDR.

Time period segment 106 may define each time period in any of a variety of ways. For example, time period segment 106 may define a first time period by data representing (i) a date (e.g., Dec. 31, 2007), (ii) a start time (e.g., 11:00 P.M. Central Standard Time (hereinafter "C.S.T.")), and (iii) a time duration (e.g., 2 hours). In this example, the first time period is defined as 11:00 P.M. C.S.T., Dec. 31, 2007 to 1:00 A.M. C.S.T., Jan. 1, 2008.

As another example, time period segment 106 may define a second time period by data representing (i) a start date (e.g., Dec. 31, 2007), (ii) a start time (e.g., 11:00 P.M. C.S.T.), (iii) an end date (e.g., Jan. 1, 2008), and (iv) an end time (e.g., 12:30 A.M. C.S.T.). In this example, the second time period is defined as 11:00 P.M. C.S.T., Dec. 31, 2007 to 12:30 A.M. C.S.T., Jan. 1, 2008.

As yet another example, time period segment 106 may define a third time period by a data representing a date (e.g., Dec. 31, 2007). In this example, the third time period may be defined as 12:00 A.M. C.S.T., Dec. 31, 2007 till 12:00 A.M. C.S.T., Jan. 1, 2008. Other examples of ways time period segment 106 may define a time period are also possible.

Priority value segment 108 may identify one or more priority values. Each priority value may comprise a number that represents a relative level of priority for (i) a particular geographic area, and (ii) a particular time period associated with the particular geographic area. As an example, a priority value of 1 (i.e., PV1) may be the highest priority value, and a priority value of 2 (i.e., PV2) may be a priority value that is the next highest priority value. The first geographic area 200 and the first time period may be associated with PV1, and the second geographic area 202 and the second time period may be associated with PV2. Other examples of the one or more priority values are also possible.

The one or more priority values may be used for various reasons. For example, in the case when EDR 100 defines multiple geographic areas and a time period for each of the geographic areas, EDR 100 may include multiple priority values so as to indicate a particular order of the geographic areas (and time periods). In this way, the network entity and/or the media provider receiving EDR 100 may prioritize the sending of media files to the media requester according to the particular order.

As another example, if a bank robbery occurs within the first geographic area 200, a user of media requester 500 may define EDR 100 so as to request and receive media files associated with the bank robbery. If the user of media requester 500 believes that the bank robbers fled to the second geographic area 202, the user may associate priority values PV1 and PV2 with the first geographic area 200 and the second geographic area 202, respectively, on the perceived likelihood that media files captured in the first geographic area 200 are more likely to be associated with the bank robbery than media files captured in the second geographic area 202. Other exemplary uses of one or more priority values are also possible.

Media requester ID segment 110 may identify one or more media requesters so that a network entity and/or a media provider can add an address to media files to be provided to the one or media requesters. Media requester ID segment 110 may identify one or more media requesters in any of a variety of ways. For example, media requester ID segment 110 may identify a media requester by (i) an Internet Protocol (IP) address associated with the media requester, (ii) a manufacturing serial number associated with the media requester, (iii) a mobile identification number (MIN) associated with the media requester, and/or (iv) a name of a user of the media requester. Other examples of ways to identify a media requester in media requester ID segment 110 are also possible.

Preferred media provider identification segment (PMPIS) 112 may identify one or more preferred media providers and/or one or more preferred media provider users. A preferred media provider and a preferred media provider user are examples of a media requester user's preferred source for media files. As an example, the preferred media provider may be a particular category of media provider devices, such as camera phones or digital cameras that capture images with a resolution of more than 5.0 mega-pixels. As another example, the preferred media provider user may be a particular person, or a person from a defined category of people such as professional photographers or police officers, or a person from a particular agency or company. If the PMPIS 112 identifies more than one preferred media provider and/or more than one preferred media provider user, the PMPIS 112 may indicate an order of preference of the preferred media providers and/or preferred media provider users, such as listing them in order.

Checksum segment 114 may comprise a value for checking the integrity of the data within EDR 100. Any of a variety of ways to calculate checksums known by those skilled in the art may be used to calculate the value of checksum segment 114.

2. Exemplary Architecture

Figure 4:
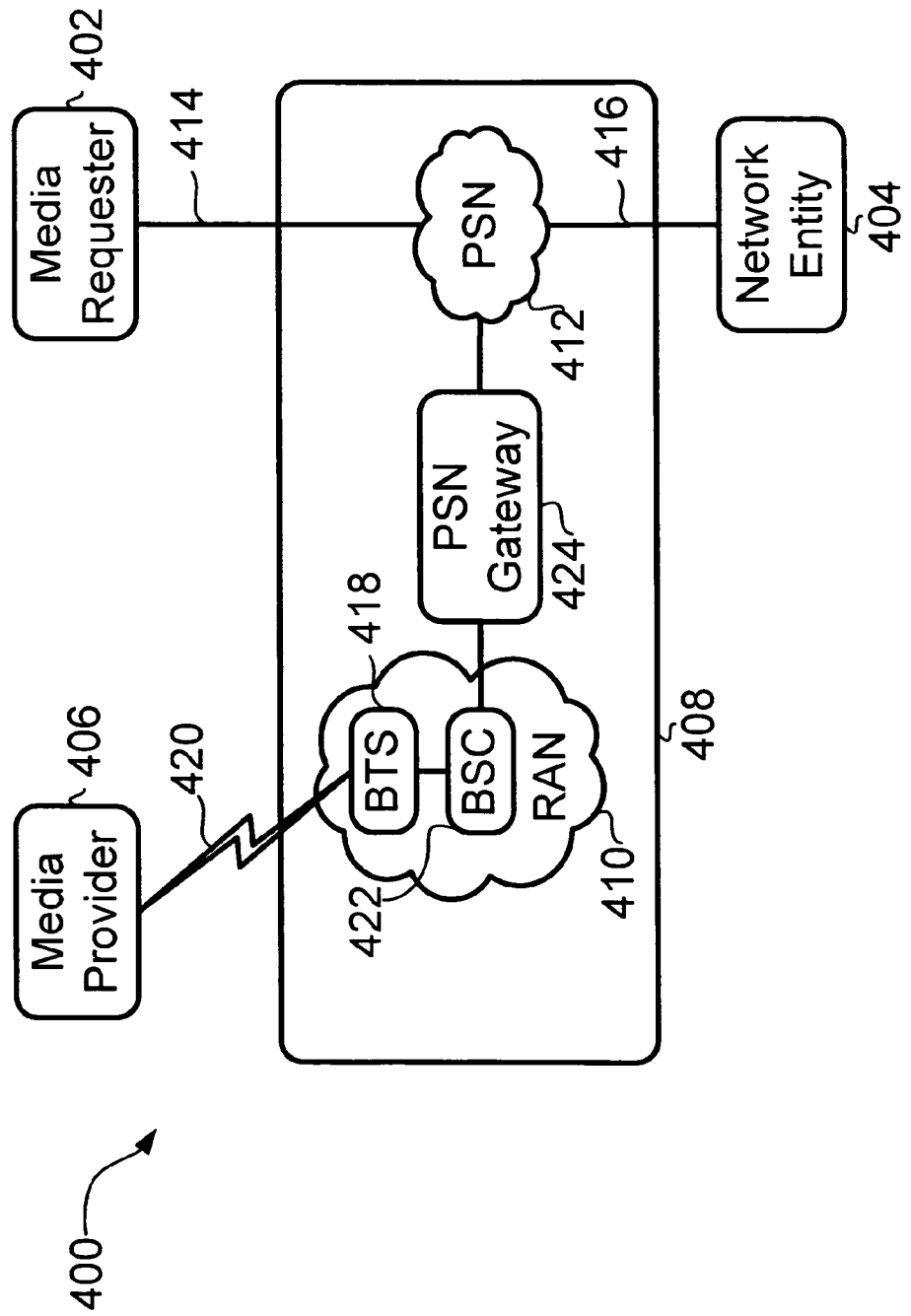
FIG. 4 is a block diagram depicting a system architecture in which an exemplary embodiment can be carried out.

FIG. 4 depicts a system 400 for carrying out the present invention. System 400 includes a media requester 402, a network entity 404, a media provider 406, and a network 408. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location.

a. Media Requester

Media requester 402 may be arranged in any of a variety of configurations. For instance, media requester 402 may be arranged as a device and/or system that (i) directly or indirectly requests media provider 406 to provide media requester 402 with one or more media files, and (ii) responsively receives one or more media files. In particular, by way of example, media requester 402 may be arranged as a cellular phone, a wireless personal digital assistant (PDA), or a desktop computer. Other examples of a device and/or system that may request and responsively receive one or more media files are also possible.

A variety of users (i.e., media requester users) may use media requester 402 to directly or indirectly request one or more media files from media provider 406. For example, a user of media requester 402 may be a law enforcement officer that requests media files associated with a given event. In this regard, the given event may be an event in which a law has been broken. As another example, a user of media requester 402 may be a news reporter that requests media files associated with an event the reporter is researching. Other examples of a user of media requester 402 are also possible.

Figure 5:
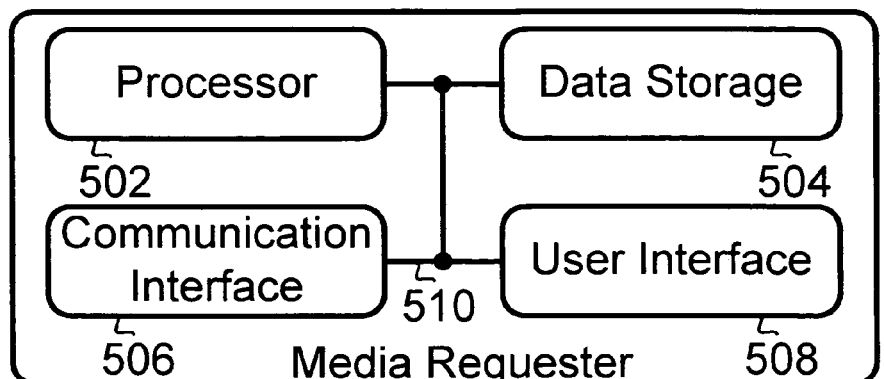
FIG. 5 is a block diagram depicting details of an exemplary media requester.

FIG. 5 depicts details of an exemplary media requester 500. Media requester 402 may be arranged as media requester 500. As shown in FIG. 5, media requester 500 includes a processor 502, data storage 504, a communication interface 506, and a user interface 508, all linked together via a system bus, network, or other connection mechanism 510.

Processor 502 may comprise one or more processors (e.g., one or more general purpose processors and/or one or more digital signal processors). Processor 502 is arranged to carry out functions described herein, and may do so by executing program instructions and/or interacting with data storage 504, communication interface 506, user interface 508, and/or connection mechanism 510.

Data storage 504 comprises a computer readable medium. A computer readable medium may comprise volatile and/or non-volatile storage components, such as optical, magnetic, organic or other memory or disc storage, which can be integrated in whole or in part with a processor, such as processor 502. Alternatively, the entire computer readable medium may be remote from a processor and coupled to the processor by a connection mechanism, such as connection mechanism 510.

Data storage 504 may store various types of data. In one respect, data storage 504 may store data arranged as program instructions that are executable by processor 502 in response to the occurrence of an event, such as expiration of a timer, receiving an input via user interface 508, or some other event. The program instructions may comprise instructions that (i) cause processor 502 to create an EDR, and (ii) cause communication interface 506 to thereafter send the EDR to network 408 for transmission, in turn, to network entity 404 or to media provider 406. The program instructions may also comprise instructions that (i) cause data storage 504 to store an EDR, or (ii) cause communication interface 506 to send data to network 408 for transmission, in turn, to network entity 404 so that network entity 404 can create an EDR.

In another respect, data storage 504 may store data arranged as one or more media files. The one or more media files may include a media file that media requester 500 receives via network 408 from network entity 404 or from media provider 406. Other examples of data storable in data storage 504 are also possible.

Communication interface 506 provides an interface between network 408 and other portions of media requester 500, such as processor 502 and data storage 504. Communication interface 506 provides means for media requester 500 to perform communications over network 408, and in turn, communications with network entity 404 and media provider 406. The media requester 500 may also communicate with other media requesters, network entities, and media providers that are not shown in FIG. 4.

Communication interface 506 may be arranged in various ways. For example, communication interface 506 may be arranged to interface with a wireline network via a physical network link that physically couples the communication interface 506 and the network 408. The wireline network, as well as the physical network link, may include one or more electrical conductors (e.g., copper wires) and/or one or more optical fibers for performing wireline communications.

If media requester 500 is arranged as a desktop computer, communication interface 506 may be arranged as a Network Interface Card (NIC) that physically couples to a wireline portion of network 408 via a physical network link. A NIC may include a chipset for performing communications over (i) the physical network link, and (ii) network 408. Communications performed over the physical network link and wired portions of network 408 are identified herein as "wireline communications." An exemplary NIC with a chipset for performing wireline communications according to the Institute of Electrical and Electronic Engineers (IEEE) 802.3 protocol is the SP2610R Gigabit Ethernet Adapter NIC manufactured by the Spectrum Technologies Corporation of Taipei Hsien, Taiwan, Republic of China. Other examples of NICs with a chipset for performing wireline communications are also possible. As another example, communication interface 506 may be arranged to interface with a wireless portion of network 408 via an air interface. The air interface may carry out communications using any of a variety of air interface protocols. Examples of an air interface protocol include (i) a Code Division Multiple Access (CDMA) protocol, (ii) a Time Division Multiple Access (TDMA) protocol, (iii) an Advance Mobile Phone Service (AMPS) protocol, (iv) an IEEE 802.11 protocol, and (v) the Bluetooth® protocol. Other examples of an air interface protocol are also possible.

If media requester 500 is arranged as a cellular phone or some other wireless communication device, communication interface 506 may be arranged as an interface that includes a chipset and an antenna for communicating via an air interface of a radio access network (RAN). Details of such a RAN are provided below. An exemplary chipset that facilitates air interface communication according to a CDMA protocol is the MSM6000™ chipset manufactured by Qualcomm Incorporated of San Diego, Calif. Other examples of a chipset that facilitate communications according to an air interface protocol are also possible.

User interface 508 may provide various means for a user to interact with media requester 500. In one respect, the means to interact with media requester 500 may include means for a user to enter data into media requester 500. The means for entering data into media requester 500 may include a keyboard and mouse, a keypad with one or more buttons, and/or a speech recognition system. Other examples of means for a user to enter data into media requester 500 are also possible.

A user may enter a variety of data into media requester 500, and in response to the data being entered, processor 502 may execute certain program instructions. For example, a user may enter data for one or more segments of EDR 100 and, in response to receiving this data, processor 502 may execute program instructions that cause processor 502 to (i) create an EDR, and/or (ii) modify an EDR that was created prior to the user entering the data, and/or (iii) send the EDR to network 408 for transmission, in turn, to network entity 404.

As another example, a user of media requester 500 may enter data to select one or more media files from a set of media files provided by media provider 406 or network entity 404 and, in response to receiving this data, processor 502 may execute program instructions that cause user interface 508 to present the selected media files to the user. Other examples of data a user may enter into media requester 500 and other examples of program instructions processor 502 may execute in response to the user entering the data are also possible.

In another respect, the means to interact with media requester 500 may include means for media requester 500 to provide data to a user of media requester 500. As an example, the data provided to the user of media requester 500 may include data that prompts the user to enter data for creating EDR 100. As another example, the data provided to the user of media requester 500 may include one or more media files. Other examples of data that media requester 500 may provide to a user of media requester 500 are also possible.

A variety of means are available for providing data to a user of media requester 500. For example, means for providing data to the user may include: (i) one or more speakers for presenting audible sounds to the user, and/or (ii) one or more displays for presenting images viewable by the user. The one or more displays may include a liquid crystal display (LCD), an organic light emitting diode (OLED) display, and/or one or more other types of displays. Other examples of means for providing data to a user of media requester 500 are also possible.

b. Network Entity

Network entity 404, shown in FIG. 4, may include a device and/or system that interfaces with network 408 and that communicates with media requester 402 and/or media provider 406. Network entity 404 may be arranged as a server that provides services to media requester 402, to media provider 406, and/or to one or more other devices/systems that interface to network 408.

Figure 6:
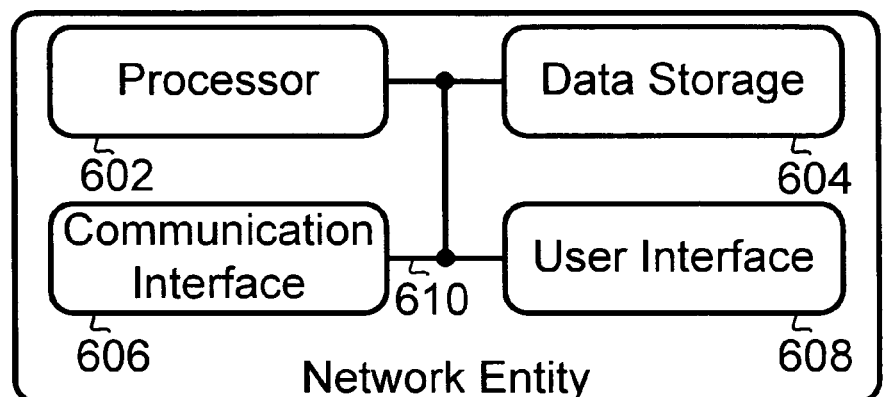
FIG. 6 is a block diagram depicting details of an exemplary network entity.

FIG. 6 depicts details of an exemplary network entity 600. Network entity 404 may be arranged as network entity 600. Network entity 600 includes a processor 602, a communication interface 604, data storage 606, and a user interface 608, all linked together via a system bus, network, or other connection mechanism 610.

Processor 602 may comprise one or more processors. Processor 602 is arranged to carry out functions described herein, and may do so by executing program instructions and/or interacting with data storage 604, communication interface 606, user interface 608, and/or connection mechanism 610.

Data storage 604 comprises a computer readable medium. Data storage 604 may store various types of data. One type of data storable in data storage 604 is data arranged as program instructions executable by processor 602. As an example, program instructions executable by processor 602 may include instructions that (i) cause processor 602 to create EDR 100, and (ii) thereafter, cause communication interface 606 to send EDR 100 to network 408 for transmission, in turn, to media provider 406. As another example, program instructions executable by processor 602 may include instructions that cause data storage 604 to store EDR 100. Other examples of program instructions executable by processor 602 are also possible.

Another type of data storable in data storage 604 is data representing one or more media files. The one or more media files may include a media file that network entity 600 receives via network 408 from media provider 406 and/or from one or more other media providers (not shown).

Yet another type of data storable in data storage 604 is data associated with the one or more media files. Network entity 600 may receive this exemplary data via network 408 from media provider 406 and/or from one or more other media providers (not shown). Examples of the data associated with the one or more media files are listed below. Other examples of data storable in data storage 604 are also possible.

Communication interface 606 provides an interface between network 408 and other portions of network entity 600, such as processor 602 and data storage 604. Communication interface 606 provides means for network entity 600 to perform communications over network 408. Examples of such communications include: (i) receiving one or more EDRs from media requester 402, and (ii) receiving, from media provider 406, one or more media files and media file data associated with each of the one or more media files.

User interface 608 may provide various means for a user to interact with network entity 600. The means to interact with network entity 600 may include means for a user to enter data into network entity 600. The means for entering data into network entity 600 may include a keyboard and mouse, a keypad with one or more buttons, and/or a speech recognition system. Other examples of means for a user to enter data into network entity 600 are also possible.

The means to interact with network entity 600 may also include means for network entity 600 to provide data to a user of network entity 600. For example, the means for providing data to the user may include: (i) one or more speakers for presenting audible sounds to the user, and/or (ii) one or more displays for presenting images viewable by the user. Other examples of the means for providing data to a user of network entity 600 are also possible.

c. Media Provider

Returning to FIG. 4, media provider 406 may be arranged in any of a variety of configurations. For instance, media provider 406 may be arranged as a device and/or system that captures (and that subsequently provides) one or more media files to network 408. In particular, media provider 406 may comprise a camera phone or a desktop computer in combination with a digital camera that couples to the computer. Other examples of a device and/or system that captures (and that subsequently provides) one or more media files to network 408 are also possible.

Figure 7:
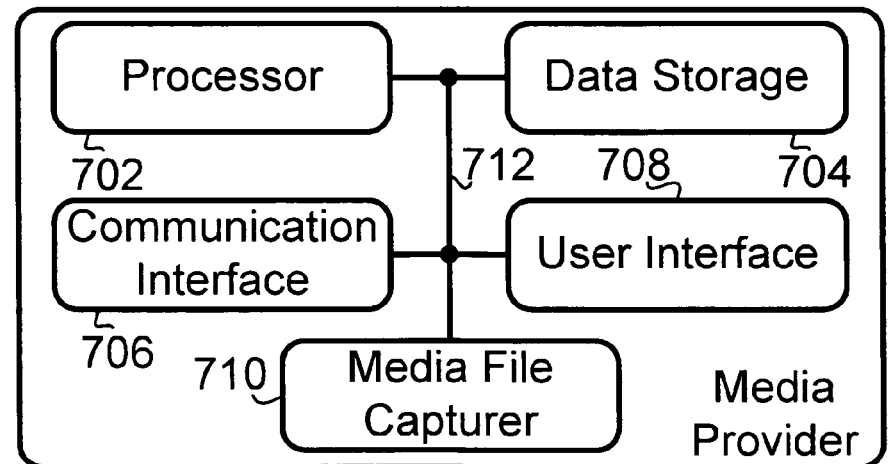
FIG. 7 is a block diagram depicting details of an exemplary media provider.

FIG. 7 depicts details of an exemplary media provider 700. Media provider 406 may be arranged as media provider 700. Media provider 700 includes a processor 702, data storage 704, a communication interface 706, a user interface 708, and a media file capturer 710, all linked together via a system bus, network, or other connection mechanism 712.

Processor 702 may comprise one or more processors. Processor 702 is arranged to carry out functions described herein, and may do so by executing program instructions and/or interacting with data storage 704, communication interface 706, user interface 708, media file capturer 710, and/or connection mechanism 712.

Data storage 704 comprises a computer readable medium. Data storage 704 may store various types of data. One type of data storable in data storage 704 is data arranged as program instructions executable by processor 702. As an example, program instructions executable by processor 702 may include: (i) instructions that cause the media file capturer 710 to capture a media file, (ii) instructions that cause data storage 704 to store a media file, and (iii) instructions that cause the communication interface 706 to send a media file to network 408 in response to an EDR received over network 408. Other examples of program instructions executable by processor 702 are also possible.

Another type of data storable in data storage 704 is data representing one or more media files. The data representing one or more media files may be data captured by media file capturer 710. Alternatively, the data representing one or more media files may be data sent to media provider 700 from a remote media file provider (not shown) via network 408.

Yet another type of data storable in data storage 704 is data associated with the one or more media files. The data associated with each media file may identify a location where each media file was captured and a time when the media file was captured. Media provider 700 may include a Global Positioning System (GPS) receiver to acquire location and time data that may be stored as data associated with a media file. Other examples of ways to acquire data associated with a media file and other examples of data storable in data storage 704 are also possible.

Communication interface 706 provides an interface between network 408 and other portions of media provider 700, such as processor 702 and data storage 704. Communication interface 706 provides means for network entity 700 to perform communications over network 408. Examples of such communications include: (i) receiving one or more EDRs from media requester 402 or from network entity 404, (ii) receiving data associated with a media file, and (iii) transmitting one or more media files and associated media file data to the network 408 for transmission, in turn to media requester 402.

User interface 708 may provide various means for a user to interact with media provider 700. The means to interact with media provider 700 may include means for a user to enter data into media provider 700. The means for entering data into media provider 700 may include a keyboard and mouse, a keypad with one or more buttons, and/or a speech recognition system. Other examples of means for entering data into media provider 700 are also possible.

A user may enter a variety of data into media provider 700. The data entered into media provider 700 may cause processor 702 to responsively execute certain program instructions. For example, the user may enter data that indicates when media provider 700 should begin capturing a media file, and in response to receiving such data, processor 702 may execute program instructions that cause media file capturer 710 to begin capturing a media file. As another example, the user may enter data that indicates when media provider 700 should stop capturing the media file, and in response to receiving such data, processor 702 may execute program instructions that cause media file capturer 710 to stop capturing the media file.

As another example, the user may enter data that indicates whether the user approves of providing a media file to media requester 402 or network entity 404. In response to receiving data that indicates a user approves of providing the media file to media requester 402 or network entity 404, processor 702 may execute program instructions that cause communication interface 706 to transmit the media file to network 408 for transmission, in turn, to media requester 402 or network entity 404.

As yet another example, the user may enter data that indicates which one or more media files from a set of media files should be sent to media requester 402 or network entity 404. In response to receiving such data, processor 702 may execute program instructions that cause the communication interface 706 to send the one or more media files to media requester 402 or network entity 404. Other examples of the variety of data a user may enter into media provider 700 are also possible.

In another respect, the means to interact with media provider 700 may include means for media provider 700 to provide data to a user of media provider 700. The means to provide data to the user of media provider 700 may include one or more speakers for presenting sounds audible to the user and/or one or more displays for presenting images viewable by the user. Other examples of means for providing data from media provider 700 to a user of media provider 700 are also possible.

Media file capturer 710 provides means for detecting signals that can be converted into media files. Media file capturer 710, alone or in combination with processor 702, may convert the detected signals into media files storable in data storage 704.

As an example, media file capturer 710 may include a microphone and associated circuitry for detecting audio input signals (e.g., sound waves) and for converting the audio input signals into media files storable in data storage 704. As another example, media file capturer 710 may include a digital camera that includes a lens for receiving light, an image sensor, and a shutter-release button for allowing light received at the lens to pass through the lens and in turn pass to the image sensor. The image sensor is a semiconductor device that detects light indicative of an image and produces an electronic representation (e.g., an array of pixels) of the image storable in data storage 704 as a media file. Other examples of a digital camera within media file capturer 710 are also possible.

As an alternative or in addition to using media file capturer 710 to detect signals that can be converted to media files, media provider 700 may receive media files and responsively store the received media files as media files. For example, communication interface 706 may include a Universal Serial Bus (USB) interface for interfacing to a remote digital camera via a USB cable, and for receiving one or more media files from the digital camera via the USB cable. Communication interface 706 may transfer the received media files over connection mechanism 712 to data storage 704. Data storage 704 may store the received media files. Other examples of media provider 700 receiving media files and responsively storing the media files are also possible.

d. Network

Returning to FIG. 4, network 408 provides means for media requester 402, network entity 404, and media provider 406 to perform communications with each other. A variety of other devices and systems (not shown) may also perform communications via network 408. Network 408 may comprise one or more networks. For example, as shown in FIG. 4, network 408 includes a radio access network (RAN) 410 and a packet-switched network (PSN) 412. Other examples of networks of network 408 are also possible.

Media requester 402 interfaces to network 408 via PSN 412. Media requester 402 may interface to PSN 412 via a physical network link 414. As an example, physical network link 414 may include a Category 5 (Cat 5) cable or a USB cable. Alternatively, media requester 402 may interface to PSN 412 via an air interface, such an IEEE 802.11 air interface. In this way, PSN 412 may include a wireless access point that communicates using an IEEE 802.11 air interface protocol. Further, and alternatively or in combination, media requester 402 may interface to network 408 via RAN 410.

PSN 412 includes a network for routing packets of data from a sender (e.g., media requester 402) to a receiver (e.g., network entity 404). The packets of data are routed to the receiver's address that is encoded within the packets. The packets may travel over different paths to reach the receiver as there is no requirement that PSN 412 establish a dedicated communication path between the sender and receiver. The packets of data may include EDR 100, a media file, and/or media file data. PSN 412 may include the Internet.

Network entity 404 interfaces to network 408 via PSN 412. Network entity 404 may interface to PSN 412 via a physical network link 416 coupled between network entity 404 and PSN 412. Alternatively or in combination, network entity 404 may interface to network 408 via RAN 412.

Media provider 406 interfaces to network 408 via RAN 410. Alternatively or in combination, media provider 406 may interface to network 408 via PSN 412.

RAN 410 includes various elements for performing wireless communications. For example, RAN 410 may include: (i) a base transceiver station (BTS) 418, (ii) a radio frequency (RF) air interface 420 operating between media provider 406 and BTS 418, and (iii) a base station controller (BSC) 422. BTS 418 radiates RF signals away from BTS 418 to form a cell. The radiated RF signals are arranged according to an air interface protocol, such as a CDMA protocol, a TDMA protocol, an AMPS protocol, or some other air interface protocol.

BSC 422 performs many functions. For example, BSC 422 (i) manages the use of BTS 418, and (ii) controls handoff of a wireless device from one BTS to another BTS as media provider 406 moves from one cell to another cell. Other examples of BSC functions are also possible.

BSC 422 may provide connection interface to a packet-switched network gateway 424. Packet-switched network gateway 424 may convert data in a first form that is compatible with transmitting on a first network (e.g., RAN 410) to data in a second form that is compatible with transmitting on a second network (e.g., PSN 412). An example of packet-switched network gateway 424 is a packet data serving node (PDSN).

3. Exemplary Operation

Figure 8:
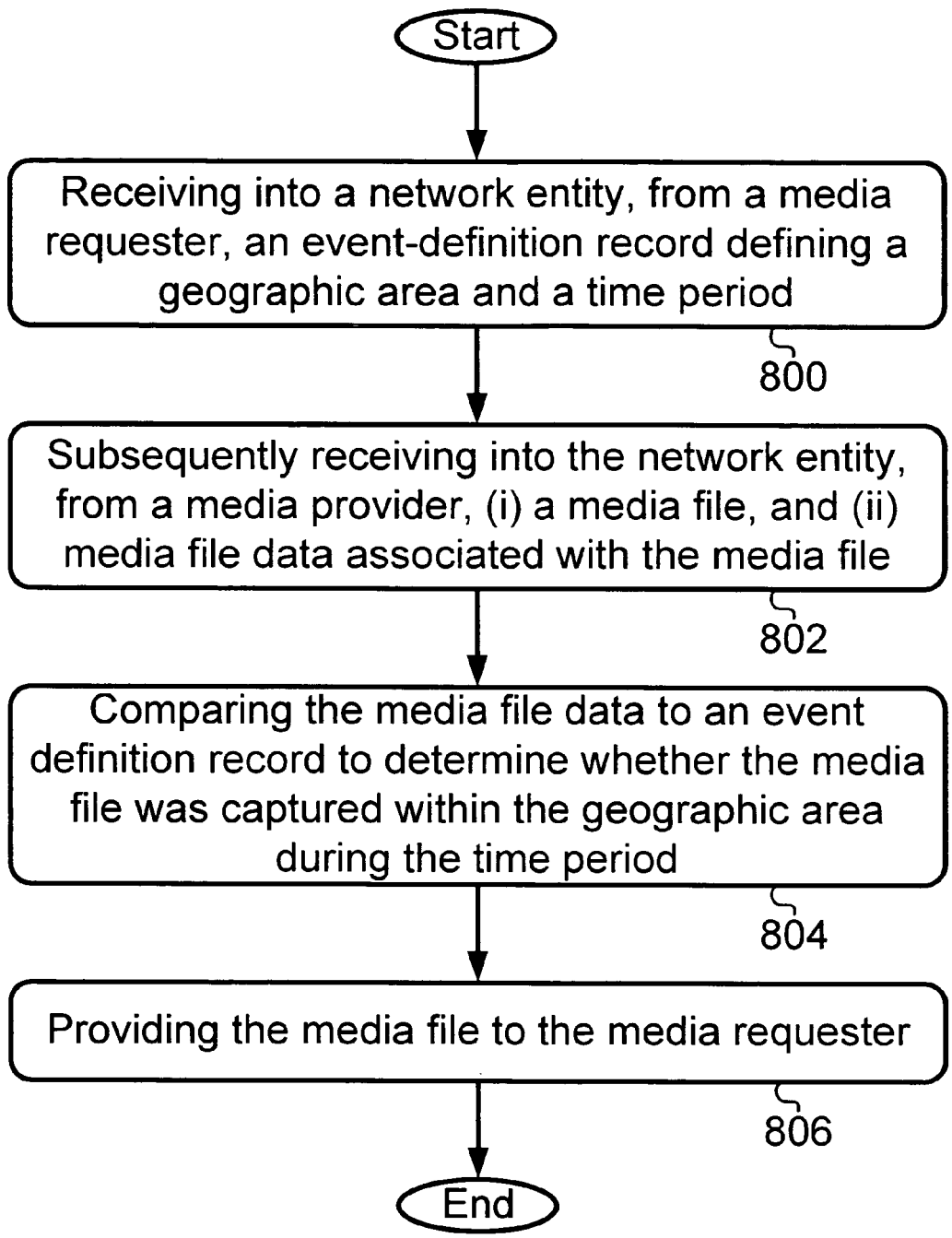
FIG. 8 is a flow chart depicting a set of functions that can be carried out in accordance with an exemplary embodiment.

FIG. 8 is a flow chart provided to illustrate some of the functions that may be carried out in accordance with exemplary embodiments of the present invention. The functions shown in FIG. 8 may be carried out in an order as shown in the figure (i.e., from top to bottom). Alternatively, the functions shown in FIG. 8 may be carried out in a different order and/or two or more of the functions may be carried out in combination.

As shown in FIG. 8, block 800 includes receiving an EDR into a network entity, such as network entity 600. Network entity 600 may receive the EDR from media requester 500. Network entity 600 may receive multiple EDRs that are sent from media requester 500 and/or from one or more other media requesters (not shown).

Network entity 600 may receive the EDR at a given time relative to a time period defined in the EDR. For example, network entity 600 may receive the EDR at a given time that is (i) before the time period defined in the EDR, (ii) during the time period defined in the EDR, or (iii) after the time period defined in the EDR.

After receiving the EDR, network entity 600 may store the EDR in data storage 604. If network entity 600 receives multiple EDRs, network entity 600 may combine some or all of the EDRs together into a combination-EDR and may store the combination-EDR in data storage 604 as well.

A combination-EDR may be created when two or more EDRs define substantially the same geographic area and/or substantially the same time period. A combination-EDR may be created to reduce the amount of time processor 602 functions to compare media file data to EDRs. Other reasons for creating a combination-EDR are also possible.

As an example, network entity 600 may receive: (i) a first EDR defining a geographic area A and a time period 1, and (ii) a second EDR defining a geographic area B and a time period 2. For this example, geographic area B includes geographic area A, and time period 1 includes the time period defined by time period 2. Processor 602 may execute program instructions for (i) determining that geographic area A is substantially similar to geographic area B, (ii) determining that time period 1 is substantially similar to time period 2, and (iii) forming a combination-EDR by storing in data storage 604 a record that includes the geographic area B and the time period 1. Other examples of creating a combination-EDR are also possible.

In response to receiving the EDR, network entity 600 may create a request message associated with the EDR. The request message may be sent media provider 700, and may be sent to one or more media providers as well. The request message may include a request for the media provider 700 to transmit any media files that media provider 700 captures (i) within a geographic area defined by an EDR or a combination-EDR, and (ii) during a time period defined by the EDR or the combination EDR.

The request message may include other information in addition to the request. For example, the request message may include a deadline (e.g., 1:00 P.M. E.S.T, Jan. 8, 2007) for transmitting media files to media requester 500. In this way, a user of media requester 500 may not provide compensation to a user of media provider 700 if media provider 700 provides media files to media requester 500 after the deadline. As another example, the request message may include a media file limit (e.g., 50 media files) or media file size limit (e.g., 5 million data bytes). In accordance with this example, media provider 700 should not provide media files for sending to media requester 500 in excess of the limits specified in the request message. Other examples of information the request message may include are also possible.

The media provider 700 may respond to the request message by transmitting one or more media files to network entity 600. The media provider 700 may transmit media files captured (i) prior to when media provider 700 receives the request message, (ii) while media provider 700 receives the request message, and/or (iii) after media provider 700 receives the request message.

Alternatively, prior to receiving the EDR, network entity 600 may receive and responsively store in data storage 604, media files sent from media provider 700. In this way, in response to receiving the EDR, network entity 600 can search data storage 604 to locate any media files that match the media files requested by media requester 500 without having to send a request message to media provider 700.

Next, block 802 includes a network entity receiving a media file and media file data associated with the media file. Network entity 600 may receive the media file and the media file data from media provider 700. Alternatively, network entity 600 may receive several media files and media file data associated with each of the several media files. Network entity 600 may receive the several media files and associated media file data from media provider 700 and/or from multiple media providers.

As noted above, a media provider can capture an input and responsively store a representation of the input as a media file. Various formats may be used to store an input as a media file. For example, an input comprising one or more sound waves may be stored as a Musical Instrument Digital Interface ("midi") sound file or as a Microsoft ".wav" sound file. As another example, an input comprising one or more light waves may be stored as a Joint Photographic Experts Group (".peg") image file. As yet another example, an input comprising sound waves and light waves may be stored as a Motion Pictures Expert Group ("mpeg") file. The mpeg file is an example of a multi-media file that be stored in data storage. Other examples of the various formats available for storing an input as a media file are also possible.

The media file data may include data that identifies a variety of information. For example, the media file data may include data that identifies a location where the media file was captured. The location may represent a location of media provider 700 at the time the media file was captured. As another example, the media file data may include data that identifies a time when the media file was captured. The location and the time data may be obtained from a GPS system operating within media provider 700.

As yet another example, the media file data may include data that identifies the media provider 700. The data that identifies media provider 700 may include data defining a MIN, an IP address, or some other data that identifies media provider 700. Other examples of information that may be identified by media file data are also possible.

The media file data may be arranged in any of a variety of formats. For example, the media file data may be arranged as meta data (i.e., data about data). In accordance with this example, a media file may include the media file data (i.e., the meta data). As another example, the media file data may be encrypted according to an encryption format known to those skilled in the art. The encrypted media file data may be used for determining whether the media file and/or media file data has been modified by media provider 700. Other examples, of the various formats for arranging media file data are also possible.

Next, block 804 includes comparing the media file data to the EDR to determine whether the media file was captured within the geographic area during the time period. Network entity 600 may perform the comparison by executing program instructions.

In one respect, comparison of the media file data to the EDR may include comparing the location defined by the media file data to the geographic area defined by the EDR and comparing the time when the media file was captured to the time period defined by the EDR. In this way, a determination may be made if the media file was captured within the geographic area and during the time period, as defined by media requester 500.

In another respect, comparison of the media file data to the EDR may include comparing capture locations identified in media file data for multiple media files to the geographic area(s) defined by the EDR(s) and comparing capture times identified in the media data for the multiple media files to the time period(s) defined by the EDR(s). By performing these comparisons, a set of media files may be identified. If the EDR(s) define priority values, the comparisons may also include comparing the priority value of each media file of the set of media files to determine an order for providing one or more media files from the set of media files to media requester 500.

For example, if the set of media files includes 5 media files having PV1, 5 media files having PV2, and 10 media files having a PV3 (e.g., a priority value lower in priority than PV1 and PV2, network entity 600 can compare the media files of the set so as to determine that the 5 media files having PV1 should be the first media files sent to media requester 500. If necessary, the media files having PV2 would be sent next, followed by the media files having PV3. Other examples of comparing the media file data to the EDR are also possible.

Next, block 806 includes providing the media file to media requester 500. The media file may be provided to one or more other media requesters as well. Further, multiple media files may be provided to media requester 500 and/or the one or more other media requesters. Each media file provided to media requester 500 may include a media file that were captured within the geographic area during the time period defined by the EDR received by network entity 600.

Providing the media file to media requester 500 may be carried out in various ways. For example, processor 602 may execute program instructions that cause communication interface 606 to send the media file to a network for transmission, in turn, to media requester 500. In accordance with this example, processor 602 may execute program instructions that cause address information (e.g., a MIN or an IP address) to be added to the media file so that the network can direct the media file to media requester 500. Other examples of providing the media file(s) to media requester 500 are also possible.

Network entity 600 may send media provider 700 a notice regarding a media file. For example, network entity 600 may send media provider 700 a notice that indicates network entity 600 sent media requester 500 a media file captured by media provider 700. As another example, network entity 600 may send media provider 700 a notice that indicates a user of media requester 500 has purchased a media file captured by media provider 700. Other examples of a notice network entity 600 may send to media provider 700 are also possible.

In accordance with an exemplary embodiment, network entity 600 may be associated with an enterprise. The enterprise may include a person, a partnership, a corporation, or any of a variety of other business organizations. In one respect, for example, the enterprise may own or lease network entity 600. In another respect, for example, the enterprise may operate network entity 600 or have an agreement with another enterprise in which the other enterprise operates network entity 600. Other examples of how the enterprise is associated with network entity 600 are also possible.

The enterprise may enter into a first agreement with a user of media requester 500. The first agreement may require the user of media requester 500 to pay the enterprise a fee for each media file that network entity 600, operated by the enterprise, provides to media requester 500. The first agreement may require the user of media requester 500 to pay a first fee if the user of media requester 500 provides the media file to a third party or pay a second fee if the user of media requester 500 receives the media file but does not provide the media file to a third party. The user of media requester 500 may pay the first fee or second fee in any of a variety of ways so as to purchase the media file.

The enterprise may enter into a second agreement with a user of media provider 700. The second agreement may require the enterprise to pay the user of media provider 700 a third fee for each media file provided by media provider 700 that the user of media requester 500 receives or a fourth fee for each media file provided by media provider 700 that the user of media requester 500 receives and then provides to a third party.

Upon collecting a payment (e.g., the first fee or the second fee) from the user of media requester 500, the enterprise may make a payment (e.g., the third fee or the fourth fee) to the user of media provider 700. Typically the first fee will be greater than the third fee and the second fee will be greater than the fourth fee so that the enterprise can earn a profit from operating network entity 600. Other examples of agreements between the enterprise and a user of media requester 500 or between the enterprise and the user of media provider 700 are also possible.

In accordance with another exemplary embodiment, prior to network entity 600 providing a media file to media requester 500, network entity 600 may carry out an auction to sell the media file. Multiple users of media requesters, including a user of media requester 500, may participate in the auction. By way of example, the user of media requester 500 may enter a bid using user interface 508, and communication interface 506 may transmit the bid over a network to network entity 600. Network entity 600 may receive multiple bids from the multiple users of media requesters. At the conclusion of the auction, the user of a media requester that submits the highest bid obtains the right to purchase the media file. In this way, the user of media provider 700 may maximize the payment amount to be paid for the media file. Other examples of network entity 600 performing an auction to sell a media file are also possible.

4. Conclusion

Exemplary embodiments of the present invention have been described above. Those skilled in the art will understand, however, that changes and modifications may be made to the embodiments described without departing from the true scope and spirit of the present invention, which is defined by the claims.

We claim:

1. A method comprising:
   a network entity receiving, from a media requester device, a first event-definition record and a second event-definition record, wherein the first event-definition record identifies a first geographic area, a first time period, and a first priority value of the first geographic area and the first time period, wherein the second event-definition record identifies a second geographic area, a second time period, and a second priority value of the second geographic area and the second time period, and wherein the first priority value is greater than the second priority value;

after receiving the first event-definition record and the second event-definition record, the network entity receiving, from a media provider device, a media file, and media file data associated with the media file; and the network entity comparing the media file data to the first event-definition record to determine whether the media file was captured within the first geographic area during the first time period, and if so, responsively providing the media file to the media requester device, wherein if the network entity determines that the media file was not captured within the first geographic area during the first time period, the method further comprising the network entity comparing the media file data to the second event-definition record to determine whether the media file was captured within the second geographic area during the second time period, and if so, responsively providing the media file to the media requester device.

2. The method of claim 1, further comprising:
after receiving the first event-definition record and the second event-definition record, the network entity sending to the media provider device a request for the media provider device to transmit any media files that the media provider device captures within the first geographic area during the first time period.

3. The method of claim 2, wherein the media provider device providing the media file to the media requester device is conditioned on approval by a user of the media provider device.

4. The method of claim 2, wherein the request for the media provider device to transmit any media files that the media provider device captures within the first geographic area during the first time period comprises a deadline that identifies when a user of the media requester device will no longer provide compensation for a media file sent in response to the request.

5. The method of claim 2, wherein the network entity is associated with an enterprise, the method further comprising:
the enterprise collecting a first payment from the user of the media requester device so as to carry out a purchase of the media file by the user of the media requester device; and
the enterprise providing a second payment to a user of the media provider device, wherein the second payment is provided as a result of the user of the media requester device purchasing the media file.

6. The method of claim 5, further comprising:
the network entity notifying the user of the media provider device that the media file has been purchased.

7. The method of claim 2, wherein the media file is selected from the group consisting of (i) a media file comprising data representing one or more captured images, and (ii) a media file comprising data representing captured sound.

8. The method of claim 2, wherein the media file comprises a multi-media file.

9. The method of claim 2, wherein the media file data is arranged as meta data within the media file.

10. The method of claim 9, wherein the meta data is encrypted.

11. The method of claim 2, wherein receiving the first event-definition record occurs at a given time that is before the first time period, a given time that is during the first time period, or a given time that is after the first time period.

12. The method of claim 2, further comprising:
providing the media file to one or more other media requester devices, and
the media requester device and the one or more other media requester devices bidding for a right to use the media file.

13. The method of claim 2, wherein the media provider device comprises a camera phone.

14. The method of claim 2, wherein the request for the media provider device to transmit any media files that the media provider device captures within the first geographic area during the first time period comprises a media file limit that identifies a limit selected from the group consisting of a media file size limit, and a media file quantity limit.

15. The method of claim 1,
wherein the first geographic area is a first circular area defined by a given location and a first radius extending from the given location,
wherein the second geographic area is a second circular area defined by the given location and a second radius extending from the given location, and
wherein the second radius is longer than the first radius.

16. The method of claim 1, wherein the first event-definition record further comprises a preferred media provider identification segment that identifies one or more media providers preferred by a user of the media requester device, and a preferred category of media provider devices preferred by the user of the media requester device.

17. A method comprising:
a network entity receiving, from a media requester device, a plurality of event-definition records including a first event-definition record and a second event-definition record, wherein the first event-definition record defines a first geographic area, a first time period, and a priority value associated with both the first geographic area and the first time period, wherein the second event-definition record defines a second geographic area, a second time period, and a priority value associated with both the second geographic area, and wherein the priority value associated with both the first geographic area and the first time period is greater than the priority value associated with both the second geographic area and the second time period;

after receiving the plurality of event-definition records, the network entity receiving, from one or more media provider devices, (i) a plurality of media files, and (ii) for each media file, associated file data that identifies a location where the media file was captured, and a time that the media file was captured;

the network entity comparing the associated file data for each media file to the plurality of event-definition records so as to identify a set of media files captured (i) in a geographic area defined by a given event-definition record of the plurality of event-definition records, and (ii) during a time period defined by the given event-definition record, wherein the priority value defined by the given event-definition record is a highest priority value; and providing one or more media files of the set of media files to the media requester device, wherein the first geographic area is a first circular area defined by a given location and a first radius extending from the given location, wherein the second geographic area is a second circular area defined by the given location and a second radius extending from the given location, and wherein the second radius is longer than the first radius.

18. The method of claim 17, wherein each defined geographic area defines a distinct area and each defined time period defines a distinct time period, wherein a smallest of the distinct areas is associated with (i) a shortest of the distinct time periods, and (ii) a priority value having the highest priority value, and wherein each increasingly larger distinct area relative to the smallest of the distinct areas is associated with (i) an increasing longer distinct time period relative to the shortest of the distinct time periods, and (ii) a decreasing priority value relative to the priority value having the highest priority value.

19. A system comprising:

a processor;

a communication interface that (i) receives, from a media requester device, a plurality of event-definition records, wherein the plurality of event-definition records includes a first event-definition record and a second event-definition record, wherein the first event-definition record defines a first geographic area, a first time period, and a first priority value associated with both the first geographic area and the first time period, wherein the second event-definition record defines a second geographic area, a second time period, and a second priority value associated with both the second geographic area, and wherein the first priority value is greater than the second priority value, and (ii) subsequently receives, from a media provider device, a plurality of media files and, for each media file, media file data associated with the media file; and data storage for storing the plurality of event-definition records, the plurality of media files, the media file data, and program instructions that are executable by the processor, wherein the program instructions include instructions that cause the processor to compare the media file data to the plurality of event-definition records so as to identify a set of media files that includes media files that were captured within the first geographic area during the first time period and media files that were captured within the second geographic area during the second time period, and wherein the program instructions are executable by the processor to cause the communication interface to send one or more media files of the set of media files to the media requester device, wherein the first geographic area is a first circular area defined by a given location and a first radius extending from the given location, wherein the second geographic area is a second circular area defined by the given location and a second radius extending from the given location, and wherein the second radius is longer than the first radius.

20. The system of claim 19, wherein the communication interface comprises (i) a wireless network interface for communicating with the media provider device over a wireless network, and (ii) a wireline network interface for communicating with the media requester device over a wireline network.

21. The system of claim 19, wherein the program instructions include additional program instructions that are executable by the processor after the communication interface receives the plurality of event-definition records, and wherein execution of the additional program instructions causes the communication interface to send to the media provider device a request for the media provider device to transmit any media files that the media provider device captured within the geographic area defined by the given event-definition record and during the time period defined by the given event-definition record.

* * * * *